Feb. 18, 1958    H. A. COFFIN    2,823,695
HOT WATER SYSTEM AND CONTROLS THEREFOR
Filed March 2, 1955
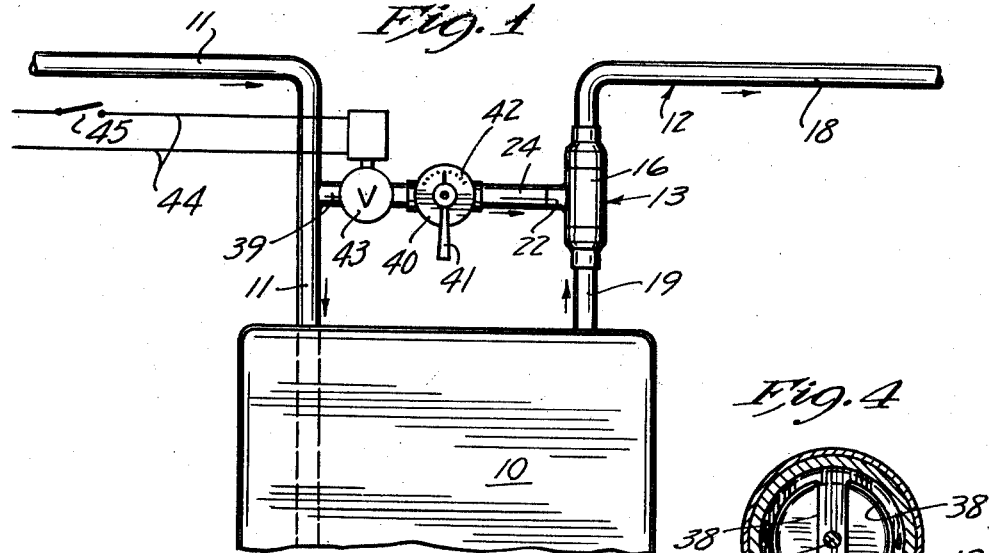
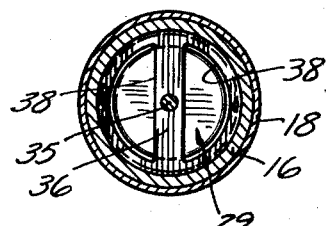
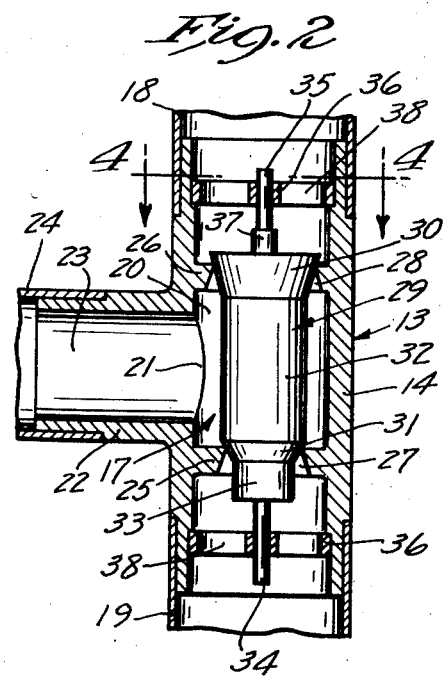
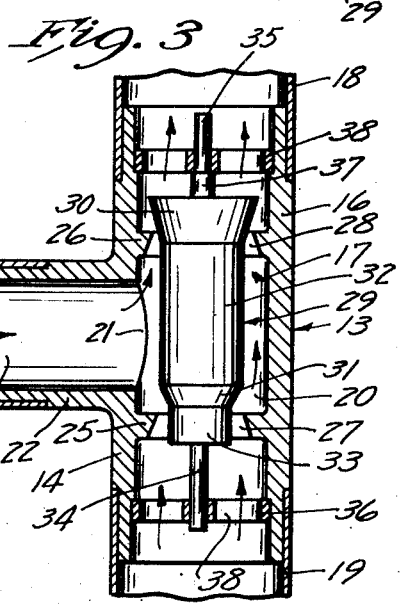
INVENTOR.
Harry A. Coffin
BY
Merchant & Merchant
ATTORNEYS

United States Patent Office 2,823,695
Patented Feb. 18, 1958

2,823,695

HOT WATER SYSTEM AND CONTROLS THEREFOR

Harry A. Coffin, Minneapolis, Minn., assignor of fifty percent to Victor F. Scholz, Minneapolis, Minn.

Application March 2, 1955, Serial No. 491,642

7 Claims. (Cl. 137—337)

My invention relates to a hot water supply system and controls therefor; in particular, it relates to a novel and improved double-valve mixing fitting to be used together with a control valve in providing a novel and improved hot water supply system having particular use in a domestic system.

An object of my invention is to provide a novel and improved double-valve mixing fitting for use in a water supply system to provide a controlled supply of hot water of selectively variable temperatures.

Another object of my invention is to provide an improved hot water supply system which increases the supply of hot water from the tank, which provides a selection of water temperatures variable between maximum and minimum values, which limits the loss of heat, and which provides means for obtaining an instantaneous change between one of the selected temperatures of water less than the maximum and the maximum temperature of water.

Another object of my invention is to provide a novel and improved mixing fitting in an improved hot water supply system which limits any variation in the water temperature from the selected value to a negligible amount when the volume of water tapped is decreased from maximum flow to minimum flow.

Another object of my invention is to provide a novel and improved double-valve mixing fitting to be used together with a control valve in an improved hot water supply system to provide an instantaneous selection of hot water temperatures variable between maximum and minimum values, and which temperature selection is unaffected by variations in the volume of water tapped from the supply.

Another object of my invention is to provide in a device of the class described in the next preceding object means for obtaining an instantaneous selection remote from the hot water tank between two different temperatures of water.

A further object of my invention is to provide a novel and/or improved double-valve mixing fitting which is compact and simply and effectively operative; and when used together with a control valve in an improved hot water supply system, it provides a simple, reliable and effective means for increasing the source of supply of hot water and for generally instantaneously selectively obtaining one of a plurality of determinable water temperatures.

These and other objects and advantages of my invention will be disclosed in the course of the following specification and claims, reference being had to the accompanying drawings wherein:

Fig. 1 is a fragmentary view, partly in side elevation and partly in schematic, showing my novel improved water supply system;

Fig. 2 is a fragmentary view in vertical section of a portion of Fig. 1 showing my novel and improved mixing fitting;

Fig. 3 is a view similar to Fig. 2 showing a different position of the movable element thereof; and Fig. 4 is a view in horizontal section taken on the line 4—4 of Fig. 2.

Referring more particularly to the drawings, wherein like parts will be indicated by the same numeral, the numeral 10 indicates a hot water tank, which may comprise any type of tank in which a quantity of water is heated to a predetermined maximum temperature and made available for use. A cold water inlet pipe 11 extends from a source of cold water under pressure to be connected to and communicate with tank 10 adjacent the bottom thereof. A hot water outlet pipe 12 is connected to and communicates with tank 10 adjacent the top thereof, and extends to one or several outlet taps, not shown in the drawings. The foregoing represents generally any conventional hot water supply system.

I provide a novel and improved mixing fitting, indicated generally in its entirety by the reference numeral 13, comprising preferably a T-shaped integral housing or casing 14. The cross portion 16 of casing 14 has a passageway 17 extending therethrough. Casing 14 is connected to spaced sections 18 and 19 of outlet pipe 12 adjacent the opposite ends of passageway 17 in any suitable manner. Preferably, cross portion 16 is reduced at its opposite ends to telescopically fit into the adjacent ends of spaced sections 18 and 19, and the cooperating telescoping ends are rigidly connected together by cement or the like. An intermediate portion of passageway 17 defines a mixing chamber 20 having a port 21 opening therein. A branch projection 22 of casing 14 has a passageway 23 formed therethrough which intersects passageway 17 generally at right angles at port 21. Branch projection 22 is connected to conduit means or pipe sections 24 in any suitable manner, but preferably has a reduced end which is telescopically received in the adjacent end of conduit means 24 and rigidly connected thereto by cement or the like. Conceivably, casing 14 might comprise merely the cross portion 16 thereof and thereby be in fact merely an intermediate portion of outlet pipe 12; with this construction, branch projection 22 of casing 14 could be integral with conduit means 24 and merely an extension thereof and be connected to the aforementioned intermediate portion of outlet pipe 12 at port 21.

Cross portion 16 of casing 14 is formed with a pair of spaced annular internally projecting rims 25 and 26 defining a lower valve seat and an upper valve seat, respectively. Rims 25 and 26 are disposed at opposite ends or limits of mixing chamber 20 and define restricted frusto-conical portions 27 and 28 of passageway 17, which form respectively a hot water inlet into mixing chamber 20 and an outlet from mixing chamber 20.

I provide a floating valve member 29 preferably comprising a first annular beveled valve-forming portion which defines a valve 30, a second annular beveled valve-forming portion which defines a valve 31, an intermediate cylindrical portion 32 which interconnects valves 30 and 31, a cylindrical diametrically reduced tail portion 33 extending axially outwardly from valve 31, and a pair of oppositely disposed guide stems or spindles 34 and 35. Preferably, cross portion 16 of casing 14 and passageway 17 are generally vertically disposed, and floating valve member 29 is mounted in passageway 17 for vertical movements between the positions shown in Figs. 2 and 3. Intermediate cylindrical portion 32 has a diameter which is greater than the smallest diameter of frusto-conical portion 27 but which is less than the smallest diameter of frusto-conical portion 28. An upper and a lower spindle supporting guide members 36 are disposed in passageway 17 and anchored to cross portion 16 of casing 14, the upper guide member 36 in axially outwardly spaced relation with rim 25 and the lower guide member 36 in axially outwardly spaced relation with rim 26. Upper guide member 36 cooperates with enlarged portion 37 of guide stem 35 to limit vertically upward movements of valve member 29. Guide members 36 have slots or apertures 38 formed therein to permit the flow of fluid through passageway 17. Although my invention as herein disclosed provides for spindles 34 and 35 and guide supports 36 therefor, valve member 29 would function just as well without such valve guide means; however, upper guide support 36 also acts as a positive stop member limiting upper vertical movements of valve member 29, and any suitable element could be substituted for upper guide member 36 to be secured to casing 14 and to function as a stop member but without being obstructive of the flow of fluid through passageway 17. Valves 30 and 31 cooperate with the valve seats formed by rims 26 and 25, respectively, to control the flow of fluid through frusto-conical portions 27 and 28 of passageway 17. Valve member 29 is gravity biased vertically downward for vertically downward movement to the limit permitted by the seating of valves 30 and 31 at their respective valve seats as shown in Fig. 2.

Conduit means 24 at its end 39, Fig. 1, is connected to and communicates with cold water inlet pipe 11. A valve 40 disposed in conduit means 24 controls the flow of fluid into mixing chamber 20. Valve 40 is manually operated by handle portion 41 thereof from a fully closed position through various degrees of open positions to a fully open position; its position is indicated by the calibration designated by the numeral 42.

I preferably provide a second valve 43 disposed in conduit means 24 which may be remotely operated to be moved between fully open and fully closed positions. As shown somewhat schematically in Fig. 1, valve 43 is preferably of any conventional electro-magnetically operated type which is normally in its fully open position. The solenoid of electro-magnetically operated valve 43 is energized by an electrical circuit indicated by the numeral 44 and comprising a normally open switch 45, which is manually movable from its open position to its closed position. Switch 45 may be positioned at any desirable location whereby the closing of switch 45 energizes the solenoid of valve 43 to move the latter to its fully closed position.

When valve 40 is in its fully opened position and the tap is open, the temperature of the water available at the tap will be at its minimum value, assuming the temperature of the hot water from tank 10 is maintained at its maximum temperature, which will consist of a mixture of cold water passing from inlet pipe 11 through conduit means 24 and into mixing chamber 20, and hot water from tank 10 passing through outlet pipe section 19 into mixing chamber 20. As valve 40 is moved from its open position to its closed position, the pressure of the cold water from valve 40 to mixing chamber 20 is decreased and the pressure of the hot water from tank 10 to mixing chamber 20 is increased; thus, as valve 40 is moved from its fully open position to its closed position, the temperature of the water from mixing chamber 20 available at the tap is gradually raised in temperature from its minimum value to its maximum value. Therefore, any desired temperature of water between the maximum and minimum values may be obtained by setting handle portion 41 of valve 40 at the proper position indicated by the calibration 42. A change in the positioning of valve 40 will effect a generally instantaneous variation in the temperature of the water at the tap.

My novel and improved double-valve mixing fitting 13 operates as follows: When the tap is open, assuming valve 40 has been opened to provide the desired moderate temperature of water at the tap, incoming cold water from inlet pipe 11 through conduit means 24 into mixing chamber 20 acts against valve 30 and the pressure of the hot water in outlet conduit section 19 acts against tail portion 33 and valve 31 to move valve member 29 from its position shown in Fig. 2 generally vertically upwardly. Valves 30 and 31 move in common and are opened together upon vertically upward movements of valve member 29. Valve 30 has opened only partially when valve 31 has reached its fully opened position. This insures a proper mixing of the hot and cold water in mixing chamber 20 before the mixed fluid passes through frusto-conical portion 28 past valve 30, so that initially upon opening the tap there will not be a rush of cold water before the hot water is properly mixed therewith, but the desired selected temperature will be constantly maintained. The tail portion 33 does not raise beyond frusto-conical portion 27 at the limit of vertically upward movements of valve member 29 to permit an even flow of hot water past valve 31 from the time valve 31 is fully open until valve member 29 reaches its limit of vertically upward movement. As shown in Figs. 2 and 3 the beveled valve-forming portion of valve member 29 which defines valve 30 does not pass beyond rim 26 during movements of valve member 29 between its two limits which acts to maintain the operation of valve member 29 steady without vibration. Upon fully closing the tap, valve member 29 will return by gravity from its limit of vertically upward movement, as shown in Fig. 3, to its limit of vertically downward movement, shown in Fig. 2, wherein both valves 30 and 31 are in their closed positions. At the closed position of valve 31, the hot water is maintained in tank 10 which prevents the upper pipes of the supply system from being excessively heated when the system is not in use and prevents thermo-circulation of the maximum temperature of water from tank 10 throughout the system. Variations in the volume of water used at the tap by varying the opening of the tap from its fully closed to its fully open position creates a buildup of pressure in outlet pipe section 18 which tends to move valve member 29 from its limit of upward movement, as shown in Fig. 3, toward its limit of downward movement, shown in Fig. 2; thus the vertical position of floating valve member 29 is dependent upon the extent of opening of the tap. Unless the amount of hot water passing into mixing chamber 20 is limited at low volumes of water passing through the system, that is when the tap is opened only a small amount to provide for a small volume of water at the tap, thermo-circulation of the maximum temperature of water from tank 10 effects an increase in the temperature of the mixed fluid above the selected temperature. This, of course, is highly undesirable. I have found that by forming the angle of bevel of valve 30 in proportion to the angle of bevel of valve 31 as 75 degrees is to 65 degrees that the thermo-circulation is limited to such an extent that there is only a negligible variation in the temperature of the mixed fluid at the tap, from the desired selected temperature as determined by valve 40, when the tap is moved from its fully closed position to its fully open position. Thus, the desired selected temperature is maintained through all variation in volume of mixed fluid at the tap. The operation of valve member 29 in this respect is as follows. As the tap is moved from a fully open position toward its closed position to decrease the volume of water available at the tap, valve member 29 moves from its limit of vertically upward movement, Fig. 3, vertically downwardly to partially close valve 31 which limits the thermo-circulation of water from tank 10. The generally critical proportion of the bevel angles of valves 30 and 31 properly limits the extent of opening of valve member 31 in relation to the volume of water being tapped.

As it may be desirable not only to have a selection of predetermined temperatures, generally instantaneously variable between maximum and minimum values, by the operation of valve 40, but also to be able to instantaneously vary the temperature of the water at the tap from its selected temperature to the maximum temperature available without adjusting valve 40, which may require walking from the tap to the basement to adjust the valve 40, I provide the remotely operated valve 43. Switch 45 may be located adjacent to the tap. Closing switch 45 immediately blocks the flow of cold water from pipe 11 into mixing chamber 20 and makes available at the tap only the maximum temperature of water from tank 10.

My novel and improved mixing fitting 13 is highly compact and effective. It has been built and tested in the hot water supply system herein disclosed and has been found to accomplish all of the aforementioned objectives and advantages. It will be obvious to those skilled in the art that my invention may be modified by many substitutions and equivalents and that this disclosure is intended to be illustrative only; therefore, I intend to be limited solely by the scope of the appended claims.

What I claim is:

1. In a hot water supply system, a hot water tank, a cold water inlet pipe connected to and communicating with said tank adjacent the bottom thereof, a hot water outlet pipe connected to and communicating with said tank adjacent the top thereof, a generally vertically disposed intermediate portion of said outlet pipe defining a mixing chamber and having a port formed therein opening into said mixing chamber, said intermediate portion being formed to provide a pair of vertically spaced valve seats at opposite limits of said mixing chamber, a generally vertically disposed floating valve member mounted in said intermediate portion for vertical movements and defining a pair of vertically spaced valves each cooperating with a different one of said valve seats, a stop member anchored to said intermediate portion disposed vertically upwardly of said valve member to limit the upward movements thereof, the downward vertical movements of said valve member being limited by the seating of said valves at their respective valve seats, said valves being constructed and arranged to open at different rates, conduit means defining a passageway between said inlet pipe and said port, and a manually-operated variably opening valve disposed in said conduit means.

2. In a hot water supply system, a hot water tank, a cold water inlet pipe connected to and communicating with said tank adjacent the bottom thereof, a hot water outlet pipe connected to and communicating with said tank adjacent the top thereof, a generally vertically disposed intermediate portion of said outlet pipe defining a mixing chamber and having a port formed therein opening into said mixing chamber, said intermediate portion being formed to provide a pair of vertically spaced valve seats at opposite limits of said mixing chamber, a generally vertically disposed floating valve member mounted in said intermediate portion for vertical movements, said valve member comprising a first annular beveled valve-forming portion and a second annular beveled valve-forming portion spaced from said first portion and an intermediate cylindrical portion interconnecting said valve-forming portions, said valve-forming portions each cooperating with a different one of said valve seats, the bevel angle of said valve forming portions being different and thereby opening at different rates, the lower valve-forming portion opening at a greater rate than the upper valve-forming portion, a stop member anchored to said intermediate portion disposed vertically upwardly of said valve member to limit the upward movements thereof, the downward vertical movements of said valve member being limited by the seating of said valves at their respective valve seats, conduit means defining a passageway between said inlet pipe and said port, and a manually-operated variably opening valve disposed in said conduit means.

3. In a hot water supply system, a hot water tank, a cold water inlet pipe connected to and communicating with said tank adjacent the bottom thereof, a hot water outlet pipe connected to and communicating with said tank adjacent the top thereof, a generally vertically disposed intermediate portion of said outlet pipe defining a mixing chamber and having a port formed therein opening into said mixing chamber, said intermediate portion being formed to provide a pair of vertically spaced valve seats at opposite limits of said mixing chamber, a generally vertically disposed floating valve member mounted in said intermediate portion for vertical movements, said valve member comprising a first annular beveled valve-forming portion and a second annular beveled valve-forming portion spaced from said first portion and an intermediate cylindrical portion interconnecting said valve portions, the angle of the bevel of said first portion being in proportion to the angle of the bevel of said second portion approximately as 75 is to 65, a stop member anchored to said intermediate portion disposed vertically upwardly of said valve member to limit the upward movements thereof, the downward vertical movements of said valve member being limited by the seating of said valves at their respective valve seats, conduit means defining a passageway between said inlet pipe and said port, and a manually operated variably opening valve disposed in said conduit means.

4. The structure defined in claim 3 in further combination with remotely-operated valve means movable between open and closed positions disposed in said conduit means.

5. A mixing fitting for a hot water supply system comprising a casing having a passageway extending therethrough, said casing being adapted to being interposed in the hot water outlet of said supply system by being connected to spaced sections of a hot water outlet pipe adjacent opposite ends of said passageway, an intermediate portion of said passageway defining a mixing chamber, said casing being formed to provide a pair of valve seats at opposite limits of said mixing chamber, said casing having a port formed therein opening into said mixing chamber and adapted to be connected to a cold water inlet pipe of said supply system, and a floating valve member mounted in said passageway for movements therein and defining a pair of spaced interconnected valves each cooperating with a different one of said valve seats and each being movable in common toward and away from its respective valve seat, said valves being constructed and arranged to open at different rates, one of said valves being adapted to control the flow of hot water into said mixing chamber and the other being adapted to control the flow of mixed fluid from said mixing chamber into the outward section of the outlet pipe.

6. The structure defined in claim 5 in which said valve member comprises a first annular beveled valve-forming portion adapted to control the flow of mixed fluid from said mixing chamber, a second annular beveled valve-forming portion adapted to control the flow of hot water into said mixing chamber, and an intermediate cylindrical portion interconnecting said valve-forming portions having a diameter less than the diameter of said passageway past the valve seat cooperating with said first valve-forming portion, the extent of opening both of said valves being variably dependent upon the position of said valve member, the position of said valve member being dependent upon the pressure in the outward section of said outlet pipe, the bevel angles of said valve-forming portions being such that said second valve-forming portion will open at a greater rate than said first valve-forming portion.

7. In a hot water supply system including a hot water tank, and a cold water inlet pipe and a hot water outlet pipe, a mixing fitting comprising a casing having a passageway extending therethrough, said casing being adapted to be interposed in the hot water outlet by being connected to spaced sections of the outlet pipe adjacent opposite ends of said passageway, an intermediate portion of said passageway defining a mixing chamber, said casing being formed to provide a pair of valve seats at opposite limits of said mixing chamber, said casing having a port formed therein opening into said mixing chamber and being adapted to be connected adjacent said port to conduit means extending through a valve to said cold water inlet pipe to provide regulated flow of cold water from said inlet pipe to said mixing chamber, and a floating valve member mounted in said passageway for movements therein toward and away from said valve seats, said valve member comprising a first annular beveled valve-forming portion and a second annular beveled valve-forming portion and an intermediate cylindrical portion interconnecting said valve-forming portions, said valve-forming portions each cooperating with a different one of said valve seats and each being movable in common toward and away from its respective valve seat, said intermediate cylindrical portion having a diameter less than the diameter of said passageway past the valve seat cooperating with said first valve-forming portion, the extent of opening of both of said valve-forming portions being variably dependent upon the position of said valve member and the position of said valve member being dependent upon the pressure in the outward section of said outlet pipe, said first valve-forming portion controlling the flow of mixed fluid from said mixing chamber and said second valve-forming portion controlling the flow of hot water into said mixing chamber, the angle of the bevel of said first valve-forming portion being in proportion to the angle of the bevel of said second valve-forming portion as 75 is to 65.

References Cited in the file of this patent

UNITED STATES PATENTS

| | | |
|---|---|---|
| 1,734,920 | Shuell | Nov. 5, 1929 |
| 1,799,266 | Wallace | Apr. 7, 1931 |
| 2,592,304 | Lubeley | Apr. 8, 1952 |